United States Patent Office 3,580,954
Patented May 25, 1971

3,580,954
PREPARATION OF 3 - ENDO-METHYL - 3-EXO-(4'-METHYL-5'-HYDROXYPENTYL) NORCAMPHOR FROM 2-METHYL-4-PENTENOL
Wayne I. Fanta and William F. Erman, Springfield Township, Hamilton County, Ohio, assignors to The Procter & Gamble Company, Cincinnati, Ohio
No Drawing. Filed Mar. 29, 1968, Ser. No. 717,374
Int. Cl. C07c 49/27
U.S. Cl. 260—586R                 14 Claims

ABSTRACT OF THE DISCLOSURE

Process for preparing 3-endo-methyl-3-exo(4'-methyl-5'-hydroxypentyl)norcamphor from 2-methyl-4-pentenol comprising the steps of (1) borating 2-methyl-4-pentenol with boric acid and/or boric anhydride to obtain tri(2-methyl-4-pentenyl)borate; (2) hydrobrominating the tri(2-methyl-4-pentenyl)borate in the presence of a free radical catalyst and, subsequently, hydrolyzing the reaction product to obtain 2-methyl-5-bromopentanol; (3) etherifying 2-methyl-5-bromopentanol with dihydropyran to obtain 2-methyl - 5 - bromopentyl tetrahydropyranyl ether; (4) alkylating 3-methylnorcamphor with the 2-methyl-5-bromopentyl tetrahydropyranyl ether to obtain tetrahydropyranyl ether of 3-endo-methyl - 3 - exo(4'-methyl-5'-hydroxypentyl)norcamphor; and (5) treating tetrahydropyranyl ether of 3-endo-methyl - 3 - exo(4'-methyl - 5' - hydroxypentyl)norcamphor with p-toluenesulfonic acid or hydrochloric acid to obtain 3 - endo-methyl-3-exo(4'-methyl-5'-hydroxypentyl)norcamphor.

FIELD OF THE INVENTION

This invention relates to a process for obtaining 3-endo-methyl - 3 - exo(4'-methyl-5'-hydroxypentyl)norcamphor which is a useful intermediate in the synthesis of dihydro-β-santalol, a compound having a valuable sandalwood odor. More specifically, this invention relates to the preparation of 3-endo-methyl-3-exo(4'-methyl-5'-hydroxypentyl)norcamphor, from 2 - methyl-4-pentenol. The 2-methyl-4-pentenol, protected as the borate, is hydrobrominated by a free radical, i.e., anti-Markownikoff, addition; the hydrobrominated alcohol obtained therefrom is etherified with dihydropyran to form 2-methyl-5-bromopentyl tetrahydropyranyl ether. 2-methyl-5-bromopentyl tetrahydropyranyl ether is used in alkylating 3-methylnorcamphor to obtain tetrahydropyranyl ether of 3-endo-methyl - 3 - exo(4'-methyl-5'-hydroxypentyl)norcamphor. This latter compound can be converted to the useful perfume compound and dihydro-β-santalol intermediate, 3-endo-methyl - 3 - exo(4'-methyl-5'-hydroxypentyl)norcamphor, by treating it with p-toluenesulfonic acid or hydrochloric acid.

HISTORY OF THE INVENTION

East Indian sandalwood oil has heretofore been available only from East Indian sandalwood trees. This oil and various individual components of the oil are highly valued perfume bases and are used in large quantities throughout the perfume industry. The oil, however, is expensive and is in limited and sometimes sporadic supply. For this reason, a continuous effort has been made to synthesize various components of the oil or similar synthetic materials which possess the desirable woody fragrance of sandalwood oil.

The process presented herein is a method of obtaining 3 - endo-methyl - 3 - exo(4' - methyl-5'-hydroxypentyl) norcamphor which is a valuable intermediate in the synthesis of dihydro-β-santalol from 2 - methyl-4-pentenol.

This process represents a portion of an extensive scientific effort to obtain dihydro-β-santalol, a novel compound having a desirable sandalwood fragrance. Other processes and intermediate compounds relating to the synthesis of dihydro-β-santalol, as well as the novel compound, dihydro-β-santalol, are described in the following copending U.S. patent applications which were filed simultaneously herewith: Fanta and Erman, 3-endo-methyl-3-exo (4'-methyl-5'-hydroxypentyl)norcamphor and 2 - methyl-5-bromopentanol, and Process for the Preparation of These Compounds, Ser. No. 717,360, filed Mar. 29, 1968; Fanta and Erman, Tetrahydropyranyl Ether Compounds and Process for the Preparation of These Compounds and 3 - endo-methyl - 3 - exo(4'-methyl-5'-hydroxypentyl) norcamphor, Ser. No. 717,384, filed Mar. 29, 1968; Fanta and Erman, Preparation of 3 - endo-methyl - 3 - exo(4'-methyl-5'-hydroxypentyl)norcamphor from 2 - methyl-4-pentenol, Ser. No. 717,362, filed Mar. 29, 1968; Fanta and Erman, Dihydro - β - santalol and Proces for Preparing Dihydro - β - santalol from 3 - endo-methyl - 3 - exo (4' - methyl - 5' - hydroxypentyl)norcamphor, Ser. No. 717,458, filed Mar. 29, 1968.

SUMMARY OF THE INVENTION

The process of this invention comprises the steps of:
(1) Borating 2-methyl-4-pentenol having the general formula

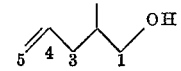

with a compound selected from the group consisting of boric acid, boric anhydride and mixtures thereof to obtain tri(2-methyl-4-pentenyl)borate having the general formula

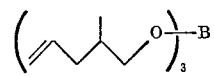

(2) Hydrobrominating the tri(2 - methyl-4-pentenyl) borate with hydrogen bromide in the presence of a catalytic amount of a free radical catalyst to form tri(2-methyl-5-bromopentyl)borate and subsequently hydrolyzing tri(2-methyl-5-bromopentyl)borate to obtain 2-methyl-5-bromopentanol having the general formula

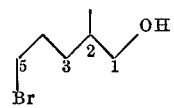

(3) Etherifying 2-methyl-5-bromopentanol with dihydropyran to obtain the 2-methyl-5-bromopentyl tetrahydropyranyl ether having the general formula

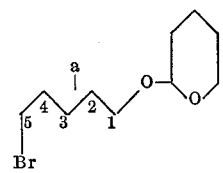

(4) Reacting 2-methyl-5-bromopentyl tetrahydropyranyl ether with a mixture prepared from 3-methylnorcamphor having the general formula

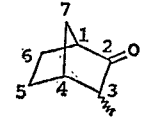

and a strong base to obtain tetrahydropyranyl ether of 3-endo - methyl - 3 - exo(4'-methyl-5'-hydroxypentyl)norcamphor having the general formula

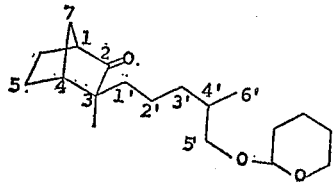

and (5) Treating tetrahydropyranyl ether of 3-endo-methyl-3-exo(4'-methyl - 5' - hydroxypentyl)norcamphor with a catalytic amount of an acid selected from the group consisting of p-toluenesulfonic acid and hydrochloric acid to obtain 3-endo-methyl-3-exo(4'-methyl-5'-hydroxypentyl)norcamphor having the general formula

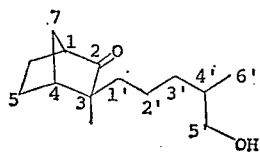

DESCRIPTION OF THE PROCESS

The initial starting compound, 2-methyl-4-pentenol, is known and can be obtained by several different methods. One method comprises reacting diethyl malonate with methyl bromide in the presence of a base to obtain diethyl methylmalonate. Diethyl methylmalonate is reacted with allyl chloride in a base catalyzed alkylation reaction to obtain diethyl methylallylmalonate. This compound is saponified with a base to obtain the salt, and then reacted with an acid to obtain the dicarboxylic acid. Heat is applied to the dicarboxylic acid at reduced pressures to obtain the monocarboxylic acid which is subsequently reduced to 2-methyl-4-pentenol with lithium aluminum hydride. The steps of this synthesis are generally described in Allen et al., "2-Methylenedodecanoic Acid," Organic Syntheses, 38, pp. 47–51 (1958), and Fray et al., "Constituents of the Lipids of Turbercule Bacilli, Part VII. Synthesis of (+)-2(L):4-Dimethyldocosanoic Acid, an Oxidation Product of Mycolipenic Acid," Journal of the Chemical Society, pp. 2036–41 (1956).

A second method of obtaining 2-methyl-4-pentenol is set forth in Cherest et al., "Addition of Grignard Reagents to the Double Bond of Allylic Alcohols," Tetrahedron Letters, No. 8, pp. 875–879 (1966). This reference discloses reacting 2.5 moles of allyl magnesium bromide with 1 mole of allyl alcohol to obtain 2-methyl-4-pentenol.

Another novel and less expensive way of obtaining 2-methyl-4-pentenol is described in the copending U.S. patent application of Fanta and Erman, 3-endo-methyl-3 - exo(4' - methyl - 5' - hydroxypentyl)norcamphor and 2-methyl-5-bromopentanol, and Process for the Preparation of These Compounds, Ser. No. 717,360, filed Mar. 29, 1968 at pages 6 and 7. (This disclosure is incorporated herein by reference.)

The first step of this invention comprises borating 2-methyl-4-pentenol, a colorless liquid having the general formula

with a compound selected from the group consisting of boric acid, boric anhydride, and mixtures thereof, to obtain tri(2-methyl-4-pentenyl)borate having the general formula

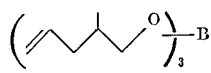

The hydroxyl functional group of the 2-methyl-4-pentenol is thereby protected in the subsequent hydrobromination reaction. Without protection of the hydroxyl group, the subsequent hydrobromination proceeds in poor yield.

A reaction mixture comprising 2-methyl-4-pentenol, boric acid and/or boric anhydride and a solvent which forms an azeotrope with water is prepared. The boric acid and/or boric anhydride is preferably used in a molar ratio of 2-methyl-4-pentenol to boric acid of about 3:1 and 2-methyl-4-pentenol to boric anhydride of about 6:1. Boric acid and/or boric anhydride can be used herein in amounts more than or less than the amounts above specified. However, if excess boric acid and/or boric anhydride is utilized in the reaction, it must be removed from the reaction mixture in an additional purifying step. If less than the amount specified is utilized herein, a portion of the 2-methyl-4-pentenol will not be protected in the subsequent step of this process.

The solvent used herein forms an azeotrope with water and, preferably, is less dense than water. Typical examples of solvents meeting this definition are benzene, toluene and xylene. Benzene and toluene are the preferred solvents for use herein. Generally, the solvent comprises from about 20% to about 99% of the reaction mixture.

This reaction mixture comprising 2-methyl-4-pentenol, boric acid and/or boric anhydride and the azeotropic solvent is allowed to react at elevated temperatures ranging from about 30° C. to about 150° C., e.g., generally at solvent reflux temperatures. As the boric acid and/or boric anhydride reacts with the 2-methyl-4-pentenol, water is formed. When the theoretical amount of water obtainable from the reaction of 2-methyl-4-pentenol and boric acid and/or boric anhydride is formed, heating is discontinued. The resulting mixture contains tri(2-methyl-4-pentenyl)borate and the solvent. The solvent can then be removed by any conventional method, e.g., by distillation, preferably, at reduced pressure. Solvent removal is not necessary, however, as the hydrobromination reaction can be conducted directly in the azeotropic solvent, preferably benzene or toluene.

It is preferable in the above described step to use apparatus similar to the Dean-Stark water trap in order to facilitate removal and measurement of the water formed during the reaction. For examples and methods of utilizing the apparatus see Wiberg, "Laboratory Techniques in Organic Chemistry", pp. 214–217, McGraw-Hill Book Company, Inc., New York (1960) and Dean et al., "A Convenient Method for the Determination of Water in Petroleum and Other Organic Emulsions," The Journal of Industrial and Engineering Chemistry, 12, pp. 486–490 (May 1920).

The second step of this process comprises hydrobrominating tri(2-methyl-4-pentenyl)borate with hydrogen bromide, preferably in gaseous form, in the presence of a catalytic amount of a free radical catalyst to form tri(2-methyl-5-bromopentyl)borate and subsequently hydrolyzing the tri(2-methyl-5-bromopentyl)borate to obtain 2-methyl-5-bromopentonol having the general formula

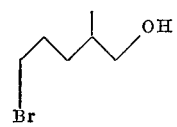

Although a solvent is not required in the hydrobromination of tri(2-methyl-4-pentenyl)borate, an aprotic solvent, i.e., a solvent which contains no readily available acid protons, is generally and preferably utilized in this step. Among the aprotic solvents suitable for use herein are hexane, pentane, cyclohexane, methylene chloride, diethyl ether, carbon tetrachloride, benzene, toluene and xylene. The aprotic solvent generally comprises from about 20% to about 99% by weight of the reaction mixture of Step 2.

Free radical catalysts suitable for use in this step are well known and are discussed in Sosnovsky, "Free Radical Reactions in Preparative Organic Chemistry," pp. 6–11, MacMillan, New York (1964). This discussion is incorporated herein by reference. These catalysts include peroxides, ozonides, thermally labile azo compounds, haloketones, and ketones and tetraethyl lead in the presence of ultraviolet light.

Hydrogen bromide is bubbled through the reaction mixture comprising tri(2 - methyl - 4 - pentenyl)borate, the aprotic solvent, and the free radical catalyst. Although only 3 moles of hydrogen bromide are theoretically required to react with 1 mole of tri(2-methyl-4-pentenyl) borate to form tri(2-methyl-5-bromopentyl)borate, the hydrogen bromide is generally introduced in large excess, e.g., 3 to 30 moles of hydrogen bromide per mole of the borate. The excess hydrogen bromide can be recycled through the reaction mixture. It is preferred that the hydrobromination reaction be run at low temperatures, i.e., from about −30° C. to about 45° C., preferably from about −10° C. to about 20° C. The low temperatures facilitate free radical, anti-Markownikoff, addition, i.e., formation of primary bromides, and impede ionic addition, i.e., formation of secondary bromides.

The reaction mixture obtained is washed with water or an aqueous solution of a salt, for example, sodium bicarbonate, sodium carbonate, or sodium chloride. The reaction mixture is washed, preferably with an aqueous solution of a base, to remove the free radical catalyst and any hydrogen bromide in the reaction mixture. If the free radical catalyst and hydrogen bromide are not removed, undesirable secondary reaction products may be formed. The water hydrolyzes the borate linkage and 2-methyl-5-bromopentanol is obtained. On standing, this mixture separates into two layers, a water layer and a layer comprised of 2-methyl-5-bromopentanol and the aprotic solvent. The water layer is removed from the reaction mixture and any water remaining in the reaction mixture is removed by any of the well known drying methods. For example, an inorganic drying agent such as magnesium sulfate can be used in this step.

The aprotic solvent can subsequently be removed from the reaction mixture, for example, by distillation, preferably under reduced pressure. The product obtained is 2-methyl-5-bromopentanol, a viscous, colorless oil.

The third step of this process comprises etherifying 2-methyl-5-bromopentanol with dihydropyran to obtain 2-methyl-5-bromopentyl tetrahydropyranyl ether having the general formula

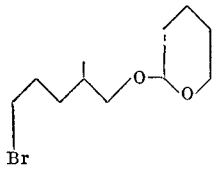

The 2-methyl-5-bromopentanol and dihydropyran are utilized in a molar ratio of dihydropyran to 2-methyl-5-bromopentanol of about 1:1 to about 1.5:1, preferably 1.2:1. A slight molar excess of dihydropyran is generally used herein to increase the rate of reaction and to obtain complete conversion of the 2-methyl-5-bromopentanol to 2-methyl-5-bromopentyl tetrahydropyranyl ether. It is advantageous to add a catalyst such as phosphorus oxychloride, hydrochloric acid, or p-toluenesulfonic acid, preferably phosphorus oxychloride in a catalytic amount, to increase the rate of reaction.

The reaction is allowed to go to completion which generally requires from about two to about six hours. The reaction mixture is then treated with a dilute solution of a strong base to remove any traces of the catalyst. The product is extracted, e.g., with ether; and the ether solution is washed in water or an aqueous salt solution, e.g., sodium bicarbonate or sodium chloride and dried. 2-methyl-5-bromopentyl tetrahydropyranyl ether is obtained upon removal of the solvent.

In the fourth step of this reaction, the 2-methyl-5-bromopentyl tetrahydropyranyl ether is reacted, preferably in an inert atmosphere, e.g., nitrogen or argon, with a mixture containing 3-methylnorcamphor, a strong base, and a solvent to obtain tetrahydropyranyl ether of 3-endo-methyl - 3 - exo(4' - methyl-5'-hydroxypentyl)norcamphor having the general formula

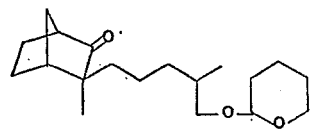

A process for preparing 3-methylnorcamphor is described in Corey et al., The Synthesis of dl-β-santalene and d,l-epi-β-santalene by Stereospecific Route, J. Am. Chem. Soc., 84, p. 2611 (1962). The endo or the exo isomers of 3-methylnorcamphor or mixtures of these isomers can be used herein.

Suitable strong bases and suitable solvents for use therewith are described in House, "Modern Synthetic Reactions," p. 185, Benjamin, New York (1965). In this step of this invention, the base-solvent system should possess a relative basicity of $pK_a$ equal to or greater than the $pK_a$ of hydroxyl ion in aprotic solvents. It is preferred that the $pK_a$ of the base-solvent system be greater than the $pK_a$ of hydroxyl ion in aprotic solvents. The strong bases include potassium-t-butoxide, sodium-t-amplate, sodium amide, potassium amide, sodium hydride, lithium hydride, dimethyl sulfoxide anion, sodium or potassium or lithium triphenyl methide and sodium naphthalenide. Solvents commonly used with these strong bases include benzene, toluene, xylene, tetrahydrofuran, and diethyl ether. Strong bases preferred for use herein are sodium amide and sodium hydride; preferred solvents are benzene, toluene, xylene, and tetrahydrofuran.

The mixture of 3-methylnorcamphor, strong base and solvent should contain 3-methylnorcamphor and strong base in a molar ratio of about 1:1. An excess of either component can be used; however, that excess does not aid the reaction and adds to the total cost. Therefore, excess amounts of these two components are generally not used. Generally, the solvent comprises from about 75% to about 95% by weight of the mixture.

This mixture of 3-methylnorcamphor, strong base and solvent is then heated to form the enolate of 3-methylnorcamphor which has the following general formula (sodium is utilized as a representative cation).

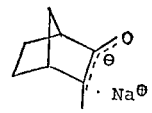

Formation of the enolate generally requires heating for from about one to about eight hours during which time hydrogen gas is evolved from the reaction mixture. When the theoretical amount of hydrogen gas is evolved, the formation of the enolate is complete. The time required for forming the enolate is, of course, dependent upon concentration of the components, amount of solvent utilized, and the intensity of the heat source.

This mixture containing the enolate of 3-methylnorcamphor and the solvent is then reacted with the 2-methyl-5-bromopentyl tetrahydropyranyl ether of Step 4 in a molar ratio of the enolate of 3-methylnorcamphor (i.e., 3-methylnorcamphor originally in the mixture) to 2-methyl-5-bromopentyl tetrahydropyranyl ether of about 1:1. Excess amounts of either component can be used in this reaction, however, the excess amount is wasted and must be removed from the product or tolerated as an impurity.

This reaction mixture containing the enolate and the tetrahydropyranyl ether compound is maintained at temperatures ranging from 40° C. to 140° C., usually at the reflux temperature of the solvent being utilized, for from about 24 to about 120 hours to obtain tetrahydropyranyl ether of 3 - endo - methyl-3-exo(4'-methyl - 5' - hydroxypentyl)norcamphor. A shorter reflux period can be utilized in this step, however, yields will suffer. Longer reflux periods can be used but no advantages are obtained. The reaction porduct, tetrahydropyranyl ether of 3-endo-methyl-3-exo-(4' - methyl-5'-hydroxypentyl)norcamphor, is isolated with, for example, ether, washed with brine and dried. The tetrahydropyranyl ether of 3-endo-methyl-3-exo(4'-methyl-5'-hydroxypentyl)norcamphor can then be obtained by removing the solvent, e.g., by distillation, and can be purified by subsequent distillation at reduced pressure.

In the fifth step of this process, tetrahydropyranyl ether of 3-endo-methyl-3-exo(4'-methyl-5'-hydroxypentyl)norcamphor is treated with a catalytic amount of p-toluenesulfonic acid or hydrochloric acid, i.e., from about 5% to about 10% by weight of tetrahydropyranyl ether of 3-endo-methyl-3-exo(4' - methyl - 5' - hydroxypentyl)norcamphor, to obtain 3-endo-methyl-3-exo(4'-methyl-5'-hydroxypentyl)norcamphor having the general formula

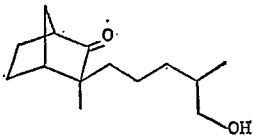

In this step of this process a short chain alcohol having from 1 to 3 carbon atoms is generally utilized as the solvent in a ratio of solvent to tetrahydropyranyl ether of 3-endo - methyl - 3 - exo(4' - methyl-5'-hydroxypentyl)norcamphor of from about 10:1 to about 20:1 by weight. The reaction mixture is maintained at temperatures ranging from about 40° C. to about 100° C. Generally, the reaction is run at solvent reflux temperature, e.g., 78° C. for ethanol, for about one hour to about five hours to obtain 3-endo-methyl-3-exo(4'-methyl - 5' - hydroxypentyl)norcamphor.

3-endo-methyl-3-exo(4' - methyl-5'-hydroxypentyl)norcamphor can easily be separated from the reaction mixture. Most of the alcohol is first removed from the reaction mixture, e.g., by distillation, and then the remaining reaction product is added to water on an aqueous brine solution. The product, 3-endo-methyl-3-exo(4'-methyl-5'-hydroxypentyl)norcamphor, is isolated with ether, dried and any remaining alcohol is removed with the ether by distillation at reduced pressure.

3-endo-methyl-3-exo(4' - methyl-5'-hydroxypentyl)norcamphor has utility as a perfume component and as an intermediate in the synthesis of dihydro-β-santalol, a very valuable sandalwood substitute. 3-endo-methyl-3-exo(4'-methyl-5'-hydroxypentyl)norcamphor and its use as a perfume and as an intermediate in the synthesis of dihydro-β-santalol is more specifically discussed in the copending U.S. patent application of Fanta and Erman, 3-endo-methyl-3-exo(4'-methyl - 5' - hydroxypentyl)norcamphor and 2-methyl-5-bromopentanol, and Process for the Preparation of These Compounds, Ser. No. 717,360, filed Mar. 29, 1968.

EXAMPLES

The following examples illustrate specific preferred embodiments of this invention and are not intended to be limiting. All percentages and ratios in the following examples as well as in the specification and in the appended claims are by weight unless otherwise indicated. Temperatures are expressed in degrees centigrade.

Data listed in all of the examples were obtained by means of the following techniques unless otherwise indicated. The apparatus described by Johnson et al., "β-Carbethoxy - γ,γ - Diphenylvinylacetic Acid," Organic Syntheses, 30, p. 18 (1950), was used to maintain a nitrogen atmosphere. Infrared spectra were determined on a Perkin-Elmer Model 13 Spectrophotometer; ultraviolet spectra were determined in ethanol on a Perkin-Elmer Model 202 Spectrophotometer. Nuclear magnetic resonance (N.M.R.) spectra were determined in carbon tetrachloride with a Varian Model HA–100 spectrometer with chemical shifts measured relative to tetramethylsilane (10τ). The N.M.R. data are noted by chemical shift, integration, multiplicity, coupling constant (in Hz.), and assignment. Gas-liquid chromatography was accomplished with an Aerograph Model 202B using a flow rate of 100 ml./min. on 5-ft. by 0.25-in. columns packed with (A) 20% FFAP (Carbowax 20 M terminated with nitroterephthalic acid) on 60/80 mesh Chromosorb P or (B) 20% SE 30 (a methyl silicone gum rubber compound) on 60/80 mesh Chromosorb W.

EXAMPLE I

Preparation of 3 - endo-methyl - 3 - exo(4'-methyl-5-hydroxypentyl)norcamphor from 2 - methyl - 4 - pentenol (A) Preparation of tri(2 - methyl-4-pentenyl)borate from 2-methyl-4-pentenol (Step 1).—A 500 ml. flask fitted with a Dean-Stark trap and condenser was charged with a solution of 25 g. (0.25 mole) of 2-methyl-4-pentenol in 250 ml. of benzene and 5.25 g. (0.083 mole) of boric acid. The reaction was refluxed under nitrogen until the theoretical amount of H$_2$O (4.5 ml.) had collected. The solution was cooled slightly and the solvent was removed at reduced pressure to afford 27.2 g. (100%) of colorless oil, $\lambda^{\text{film}}_{\text{max.}}$ 3.30, 6.11, 6.78, 7.08, 7.51, 9.61, 10.06, 10.94

N.M.R. signals at τ3.95–4.40 (1H, —CH=), 4.85–5.15 (2H, CH=CH$_2$), 6.35 (2H, doublet, J=6 Hz., CH$_2$O—), 9.11 (3H, doublet, J=7 Hz., CHCH$_3$). This material, tri(2-methyl-4-pentenyl)borate, was used directly without further purification.

Results substantially similar to those achieved in Paragraph A are obtained when 0.042 mole of boric anhydride are substituted for the 0.083 mole of boric acid in that the hydroxyl groups of the 2-methyl-4-pentenol are protected in the subsequent step. Substantially similar results are also obtained when toluene and xylene are substituted for benzene on an equal weight basis.

(B) Preparation of 2-methyl-5-bromopentanol from tri-(2-methyl-4-pentenyl)borate (Step 2).—A dry 500 ml. flask fitted with a subsurface gas inlet and reflux condenser was charged with a solution of ca. 0.25 mole of crude tri(2-methyl-4-pentenyl)borate in 250 ml. of hexane and 500 mg. of benzoyl peroxide. The mixture was cooled to 0° C. and excess anhydrous hydrogen bromide, ca. 2.5 mole, was passed in rapidly over a 50 minute period. The reaction mixture was stirred for an additional one hour; the excess gas was removed by a nitrogen sweep. The reaction product was hydrolyzed and the benzoyl peroxide and hydrogen bromide were removed with a saturated aqueous solution of sodium bicarbonate followed by a brine wash. The solution was dried with magnesium sulfate and the hexane was removed by distillation to afford 41.52 g. of 2-methyl-5-bromopentanol. This material can be used directly in the next step of this process. However, it was further purified by distillation to afford 36.8 g. (86%) of clear 2 - methyl - 5-bromopentanol, B.P. 70° (0.1 mm.). This material on redistillation, B.P. 62° (0.02 mm.) gave an oil exhibiting $n_D^{25}$ 1.4829, $\lambda^{\text{film}}_{\text{max.}}$ 2.99, 8.10, 9.68μ

N.M.R. signals at τ 4.30 (1H, OH), 6.59 (2H, doublet, J=7 Hz., CH$_2$OH'), 6.61 (2H, triplet, J=6.5 z., CH$_2$Br), 9.05 (3H, doublet, J=6 Hz., CHCH$_3$).

*Analysis.*—Calculated for $C_6H_{13}BrO$ (percent): C, 39.79; H, 7.23; Br, 44.14. Found (percent): C, 39.90; H, 7.23; Br, 44.07.

Results substantially similar to those achieved in Paragraph B are obtained when the following solvents are substituted for hexane on an equal weight basis: pentane, cyclohexane, methylene chloride, diethyl ether, carbon tetrachloride, benzene, toluene and xylene. Substantially similar results are also obtained when the following free radical catalysts are substituted for benzoyl peroxide: ozone, oxygen, t-butyl peroxide, acetyl peroxide, ascaridole, azotriphenylmethane, bromoacetone, and compounds such as acetone and tetraethyl lead in the presence of ultraviolet light.

(C) Preparation of 2-methyl-5-bromopentyl tetrahydropyranyl ether from 2-methyl-5-bromopentanol (Step 3).— A dry 50 ml. flask was charged with a mixture of 10.5 g. (0.059 mole) of 2-methyl-5-bromopentanol and 6.2 g. (0.074 mole) of dihydropyran (distilled). The flask was fitted with a drying tube, cooled to 0° C., and the solution was treated with 25 drops of phosphorus oxychloride. The resulting reaction mixture was stirred at room temperature for three hours and then added to 100 ml. of 2% aqueous sodium hydroxide. The reaction product was isolated with diethyl ether. The ether isolated was washed with brine, dried over magnesium sulfate and the solvent removed to give 15.44 grams of crude 2-methyl-5-bromopentyl tetrahydropyranyl ether. Distillation afforded 14.95 g. (96%) of colorless 2-methyl-5-bromopentyl tetrahydropyranyl ether, B.P. 83–85° (0.02 mm.). Redistillation gave 2 - methyl-5-bromopentyl tetrahydropyranyl ether exhibiting $n_D^{25}$ 1.4729, $\lambda_{max}^{film}$ 8.34, 8.91, 9.29, 9.41, 9.67, 10.21, 11.02, 11.46, 12.20$\mu$ N.M.R. signals at $\tau$ 5.55 (1H, —CH—O), 6.10–7.05 (4H, $CH_2$—O—CH—O—$CH_2$), 6.68 (2H, triplet, J=7 Hz., $CH_2Br$), 9.08 (3H, doublet, J=6 Hz., $CHCH_3$).

*Analysis.*—Calculated for $C_{11}H_{21}BrO_2$ (percent): C, 49.82; H, 7.98; Br, 30.14. Found (percent): C, 49.92; H, 8.08; Br, 30.06.

Results substantially similar to those achieved in Paragraph C are obtained when hydrochloric acid or p-toluene sulfonic acid in catalytic amounts are substituted for phosphorus oxychloride.

The 2-methyl-5-bromopentyl tetrahydropyranyl ether isolated in Paragraph C above had an odor characterized as a mild, sweet woody odor. This odor characteristic is useful in a wide variety of perfume compositions.

(D) Preparation of tetrahydropyanyl ether of 3-endo-methyl-3-exo(4'-methyl-5' - hydroxypentyl)norcamphor from 2-methyl-5-bromopentyl tetrahydropyranyl ether (Step 4).—A 500 ml. flask fitted with a condenser and addition funnel was charged with 4.9 g. (0.125 mole) of a 61% mineral oil dispersion of sodium hydride. A nitrogen atmosphere was introduced followed by 60 ml. of benzene (distilled). A solution of 12.4 g. (0.1 mole) of 3-methylnorcamphor in 60 ml. of redistilled benzene was added and enolate formation took place over two hours at reflux (80°–100°). To this refluxing reaction mixture was added a solution of 26.5 g. (0.1 mole) of 2-methyl-5-bromopentyl tetrahydropyranyl ether in 60 ml. of redistilled benzene. Reflux was continued for an additional 61 hours after which time the cooled mixture was added to brine and the product isolated with diethyl ether. The combined ether extracts were washed with brine and dried over magnesium sulfate. Removal of solvent afforded 33.52 g. of yellow oil. The crude oil contained several grams of unreacted starting materials which were smoothly removed by distillation, B.P. 30–100° (0.02 mm.). The residual oil, 20.78 g. (67%) was composed mainly of tetrahydropyranyl ether of 3-endo-methyl-3-exo(4'-methyl-5'-hydroxypentyl)norcamphor and was treated as described in the following step (Step E.). The residual oil can be distilled to afford pure tetrahydropyranyl ether of 3-endo-methyl-3-exo(4'-methyl - 5' - hydroxypentyl)norcamphor, 135–140° C. (0.02 mm.), and exhibits $\lambda_{max}^{films}$ 5.72, 8.31, 8.90, 9.28, 9.39, 9.67, 10.19, 11.00, 11.48, 12.19$\mu$ N.M.R. signals at $\tau$ 5.53 (1H, OCHO), 7.58, 7.68, (2H, $C_1$—H, $C_4$—H), 9.02 (3H, $CH_3$), 9.06 (3H, doublet, J=6 Hz., $CHCH_3$).

*Analysis.*—Calculated for $C_{19}H_{32}O_3$ (percent): C, 73.98; H, 10.46. Found (percent): C, 73.87; H, 10.53.

Results substantially similar to those obtained in Paragraph D are achieved when the following strong bases are substituted for sodium hydride on an equimolar basis: potassium-t-butoxide, sodium-t-amylate, sodium amide, potassium amide, lithium hydride, dimethyl sulfoxide anion, sodium triphenyl methide, and sodium naphthalenide. Substantially similar results are also otbained when the following solvents are substituted for benzene: toluene, xylene, and tetrahydrofuran.

The tetrahydropyranyl ether of 3-endo-methyl-3-exo (4'-methyl-5'-hydroxypentyl)norcamphor isolated above has an odor characterized as a mild herbaceous woody odor. This odor characteristic is useful in a wide variety of perfume compositions.

(E) Preparation of 3-endo-methyl-3-exo(4'-methyl-5'-hydroxypentyl)norcamphor (Step 5).—A solution of 20.78 g. (0.067 moles) of crude tetrahydropyranyl ether of 3-endo-methyl-3-exo(4' - methyl - 5'-hydroxypentyl) norcamphor and 1.5 g. (0.008 moles) of p-toluenesulfonic acid monohydrate in 250 ml. of ethanol was refluxed under nitrogen for two hours. The cooled reaction product was added to brine and the product was isolated with ether. Removal of magnesium sulfate dried solvent afforded 19.12 g. of crude 3-endo-methyl-3-exo (4'-methyl-5'-hydroxypentyl)norcamphor which on subsequent distillation gave 14.0 g. (96%) of product. Further purification by distillation, B.P. 127–130° (0.07 mm.) and gas-liquid partition chromatography gave 3-endo-methyl-3 - exo(4'-methyl - 5'-hydroxypentyl)norcamphor exhibiting $\lambda_{max}^{film}$ 2.90, 5.73, 7.30, 9.60, 10.92, 13.02$\mu$ N.M.R. signals at $\tau$ 6.68 (2H, doublet, J=6 Hz., $CH_2OH$), 7.01 (1H, OH), 7.51, 7.65 (2H, $C_1$—H, $C_4$—H), 9.01 (3H, $CH_3$), 9.08 (3H, doublet, J=6.5 Hz., $CHCH_3$).

*Analysis.*—Calculated for $C_{14}H_{24}O_2$ (percent): C, 74.95; H, 10.78. Found (percent): C, 74.81; H, 10.83.

Results substantially similar to those obtained in Paragraph E are achieved when methanol, propanol and isopropanol are substituted for ethanol on an equal weight basis. Substantially similar results are also obtained when hydrochloric acid is substiuted for p-toluenesulfonic acid monohydrate.

3-endo-methyl-3 - exo(4' - methyl - 5'-hydroxypentyl) norcamphor isolated above had an odor characterized as sweet, fruity (strawberry, pineapple, melon, berry, apple) floral note. Uses for this compound as a perfume component and as an intermediate in the synthesis of dihydro-$\beta$-santalol are more specifically set forth in Fanta and Erman, 3-endo-methyl-3-exo(4' - metthyl - 5'-hydroxypentyl)norcamphor and 2-methyl-5-bromopentanol, and Process for the Preparation of These Compounds, Ser. No. 717,360, filed Mar. 29, 1968.

EXAMPLE II

Perfume compositions

Perfume compositions containing 3-endo-methyl-3-exo (4'-methyl-5'-hydroxypentyl)norcamphor are prepared by intermixing the components shown below. The compositions exhibit highly desirable and useful odors.

Composition A.—Strawberry base

| Components: | Percent by weight |
|---|---|
| 3-endo-methyl-3 - exo(4' - methyl-5'-hydroxypentyl)norcamphor | 10 |
| Ethyl acetate | 30 |
| Ethyl benzoate | 3 |
| Ethyl butyrate | 20 |
| Ethyl nitrate | 10 |
| Ethyl pelargonate | 5 |
| Ethyl formate | 10 |
| Amyl acetate | 4 |
| Benzyl acetone | 3 |
| Methyl naphthyl ketone | 1 |
| Methyl salicylate | 2 |
| Cinnamon oil | 1 |
| Coumarin | 1 |
| | 100 |

Composition B.—Pineapple base

| Components: | Percent by weight |
|---|---|
| Amyl butyrate | 50 |
| Ethyl butyrate | 20 |
| Ethyl acetate | 5 |
| Acetaldehyde | 6 |
| chloroform | 5 |
| Lemon oil | 2 |
| 3-endo-methyl-3 - exo(4' - methyl-5'-hydroxypentyl)norcamphor | 1 |
| Propyl valerinate | 10 |
| Vanillin | 1 |
| | 100 |

The components and proportions in the perfume compositions of this example can be adjusted according to methods well known in the perfume art to form a wide variety of desirable perfume compositions containing odoriferously effective amounts of these compounds.

EXAMPLE III

Soap bar composition

A conventional household soap bar having the following composition is prepared:

| Component: | Percent by weight |
|---|---|
| Sodium soap | 75.0 |
| Potassium soap (the total soap comprises a mixture of 80% tallow soap and 20% coconut soap) | 7.5 |
| Water | 15.0 |
| Perfume Composition A of Example II | 2.5 |
| | 100.0 |

This soap bar exhibits a desirable strawberry fragrance. Composition B can be substituted for Composition A in the above soap bar composition to attain a pineapple fragrance.

What is claimed is:

1. A process for the preparation of 3-endomethyl-3-exo-(4'-methyl-5'-hydroxypentyl)norcamphor from 2-methyl-4-pentenol comprising the steps of:
   (1) borating 2-methyl-4-pentenol at a temperature from about 30° C. to about 150° C. with a boron compound selected from the group consisting of boric acid, boric anhydride and mixtures thereof to obtain tri(2-methyl-4-pentenyl)borate, the reaction being carried out in a solvent which forms an azeotrope with water and which is inert to said pentenol and said boron compound;
   (2) hydrobrominating the tri(2-methyl-4-pentenyl)borate with hydrogen bromide in the presence of a catalytic amount of a free radical catalyst which is not irreversibly reactive to said borate nor to hydrogen bromide and is selected from the group consisting of peroxides, ozonides, thermally labile azo compounds, haloketones, and ketones and tetraethyl lead in the presence of ultraviolet light, at a molar ratio of hydrogen bromide to tri(2-methyl-4-pentenyl)borate of about 3:1 to about 30:1 to form tri(2-methyl-5-bromopentyl) borate and subsequently hydrolyzing the tri(2-methyl-5-bromopentyl)borate to obtain 2-methyl-5-bromopentanol;
   (3) etherifying 2-methyl-5-bromopentanol with dihydropyran in the presence of a catalytic amount of a catalyst selected from the group consisting of phosphorus oxychloride, hydrochloric acid and p-toluenesulphonic acid and at a molar ratio of dihydropyran to 2-methyl-5-bromopentanol of from about 1:1 to about 1.5:1 to obtain 2-methyl-5-bromopentyl tetrahydropyranyl ether;
   (4) preparing a mixture of 3-methylnorcamphor, a strong base selected from the group consisting of potassium-t-butoxide, sodium-t-amylate, sodium amide, potassium amide, sodium hydride, lithium hydride, sodium triphenyl methide, potassium triphenyl methide, lithium triphenyl methide and sodium naphthalenide, and an aprotic solvent which is not reactive with said base nor said norcomphor, and heating said mixture to a temperature of from about 50° C. to about 130° C. for from about 1 hour to about 8 hours to form the enolate of 3-methyl norcamphor, and
   (5) reacting the mixture from step 4, containing the enolate of 3-methylnorcamphor, with 2-methyl-5-bromo-pentyl tetrahydropyranyl ether at a temperature of from about 40° C. to about 140° C. for about 24 hours to 120 hours to obtain the tetrahydropyranyl ether of 3-endo-methyl-3-exo(4'-methyl-5'-hydroxypentyl) norcamphor; and
   (6) treating the tetrahydropyranyl ether of 3-endo-methyl-3-exo(4'-methyl - 5' - hydroxypentyl)norcamphor with 5% to 10%, based on weight of said ether of an acid selected from the group consisting of p-toluenesulfonic acid and hydrochloric acid at a temperature of from about 40° C. to about 100° C. in a solvent selected from the group consisting of methyl, ethyl, propyl and isopropyl alcohol, wherein the ratio of solvent to said ether is from about 10:1 to about 20:1 by weight to obtain 3-endomethyl-3-exo(4'-methyl-5'-hydroxypentyl)norcamphor.

2. The process of claim 1 wherein the azeotropic solvent utilized in Step 1 comprises from about 20% to about 99% by weight of the reaction mixture.

3. The process of claim 2 wherein the azeotropic solvent utilized in Step 1 is selected from the group consisting of benzene, toluene, and xylene.

4. The process of claim 3 wherein in Step 1 boric acid is utilized in a molar ratio of 2-methyl-4-pentenol to boric acid of about 3:1.

5. The process of claim 3 wherein in Step 1 boric anhydride is utilized in a molar ratio of 2-methyl-4-pentenol to boric anhydride of about 6:1.

6. The process of claim 2 wherein the solvent is aprotic and comprises from about 20% to about 99% of the reaction mixture of Step 2 containing tri(2-methyl-4-pentenyl)borate, hydrogen bromide and a free radical catalyst.

7. The process of claim 6 wherein the reaction mixture of Step 2 is maintained at temperatures ranging from about —30° C. to about 45° C. prior to hydrolysis with an aqueous solution of a base.

8. The process of claim 7 wherein the reaction mixture of Step 2 is maintained at temperatures ranging from about —10° C. to about 20° C. prior to hydrolysis with an aqueous solution of a base.

9. The process of claim 2 wherein in Step 4 the 3-methylnorcamphor and the strong base are allowed to react in the solvent and wherein the 3-methylnorcamphor and strong base are utilized in a molar ratio of about 1:1.

10. The process of claim 9 wherein in Step 4 the solvent comprises from about 75% to about 95% of the mixture of 3-methylnorcamphor, strong base, and solvent, and wherein Step 4 is run in an inert atmosphere.

11. The process of claim 10 wherein in Step 4 the strong base is selected from the group consisting of sodium amide and sodium hydride.

12. The process of claim 10 wherein in Step 5 2-methyl-5-bromopentyl tetrahydropyranyl ether is reacted with the enolate of 3-methylnorcamphor in a molar ratio of the enolate of 3-methylnorcamphor to 2-methyl-5-bromopentyl tetrahydropyranyl ether of about 1:1.

13. The process of claim 2 wherein the reaction mixture of Step 6 comprising tetrahydropyranyl ether of 3-endo-methyl - 3 - exo(4'-methyl-5'-hydroxypentyl)norcamphor and acid is maintained at temperatures ranging from 40° C. to 100° C. for from about one to about five hours.

14. The process of claim 2 wherein in Step 3 the catalyst is phosphorus oxychloride and wherein the reaction is allowed to continue for from about two to about six hours.

References Cited

Noller et al., "Chemistry of Organic Compounds," 3rd edition, I pp. 152–153, 1965, II p. 681.

Morrison et al., "Organic Chemistry," pp. 135–136, 1962.

Corey et al., Jour. Am. Chem. Soc., vol. 84, pp. 2611–2614, 1962.

BERNARD HELFIN, Primary Examiner

N. P. MORGENSTERN, Assistant Examiner

U.S. Cl. X.R.

252—117, 132, 522; 260—347.8, 462A, 587, 633

UNITED STATES PATENT OFFICE
CERTIFICATE OF CORRECTION

Patent No. 3,580,954          Dated May 25, 1971

Inventor(s) Wayne I. Fanta and William F. Erman

It is certified that error appears in the above-identified patent and that said Letters Patent are hereby corrected as shown below:

Column 2, lines 28-31, that portion of the formula reading 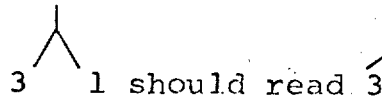 ; lines 46-51, that portion of the formula reading 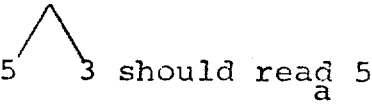 ; lines 55-63, that portion of the formula reading 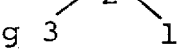 should read

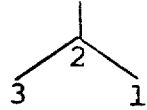

Column 3 lines 5-12, and lines 20-26, that portion of the formulas reading 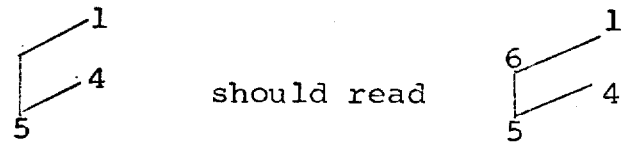 and that portion reading 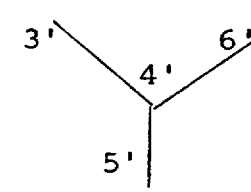 should read 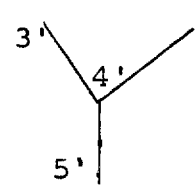

Signed and sealed this 28th day of September 1971.

(SEAL)
Attest:

EDWARD M. FLETCHER, JR.          ROBERT GOTTSCHALK
Attesting Officer                Acting Commissioner of Patents